United States Patent
Glatz

(10) Patent No.: US 10,442,258 B2
(45) Date of Patent: Oct. 15, 2019

(54) MECHANICALLY DRIVEN TIRE PRESSURE GENERATION MEANS

(71) Applicant: Dr. Ing. h.c. F. Porsche Aktiengesellschaft, Stuttgart (DE)

(72) Inventor: Michael Glatz, Weinsberg-Gellmersbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 115 days.

(21) Appl. No.: 15/724,523

(22) Filed: Oct. 4, 2017

(65) Prior Publication Data
US 2018/0099533 A1 Apr. 12, 2018

(30) Foreign Application Priority Data
Oct. 11, 2016 (DE) ............ 10 2016 119272

(51) Int. Cl.
*B60C 23/10* (2006.01)
*B60C 23/00* (2006.01)
*B60C 23/12* (2006.01)

(52) U.S. Cl.
CPC ............ *B60C 23/10* (2013.01); *B60C 23/003* (2013.01); *B60C 23/12* (2013.01)

(58) Field of Classification Search
CPC ....... B60C 23/10; B60C 23/12; B60C 23/004; B29D 30/0685
See application file for complete search history.

(56) References Cited

U.S. PATENT DOCUMENTS

| | | | | |
|---|---|---|---|---|
| 1,358,524 | A * | 11/1920 | Cooper | B60C 23/12 152/421 |
| 4,050,536 | A * | 9/1977 | Pristash | B60K 3/00 180/303 |
| 4,169,497 | A * | 10/1979 | Tsuruta | B60C 23/12 141/38 |
| 4,515,513 | A * | 5/1985 | Hayase | F04C 29/124 418/101 |

(Continued)

FOREIGN PATENT DOCUMENTS

| | | |
|---|---|---|
| DE | 8715177 U1 | 1/1988 |
| DE | 4408140 C1 | 10/1995 |

(Continued)

OTHER PUBLICATIONS

German Search Report for German Application No. 10 2016 119 272.4, dated Apr. 25, 2017 with partial translation, 8 Pages.

*Primary Examiner* — Jason R Bellinger
(74) *Attorney, Agent, or Firm* — RatnerPrestia

(57) ABSTRACT

A wheel hub arrangement having a wheel hub for mounting a rim with an inflated tire. The wheel hub arrangement has a rotary piston compressor mounted rotatably on the wheel hub. The wheel hub arrangement has a switchable mechanical coupling device, by way of which the rotary piston compressor can be switched over between a compression mode, in which the rotary piston compressor can be actuated by way of a rotational movement relative to the mounted rim or the wheel hub, and a rest mode, in which it is passive and does not produce any compressed air on the outlet side, and the rotary piston compressor producing compressed air on the outlet side for filling the tire in the compression mode.

9 Claims, 2 Drawing Sheets

(56) References Cited

U.S. PATENT DOCUMENTS

Figure 1:
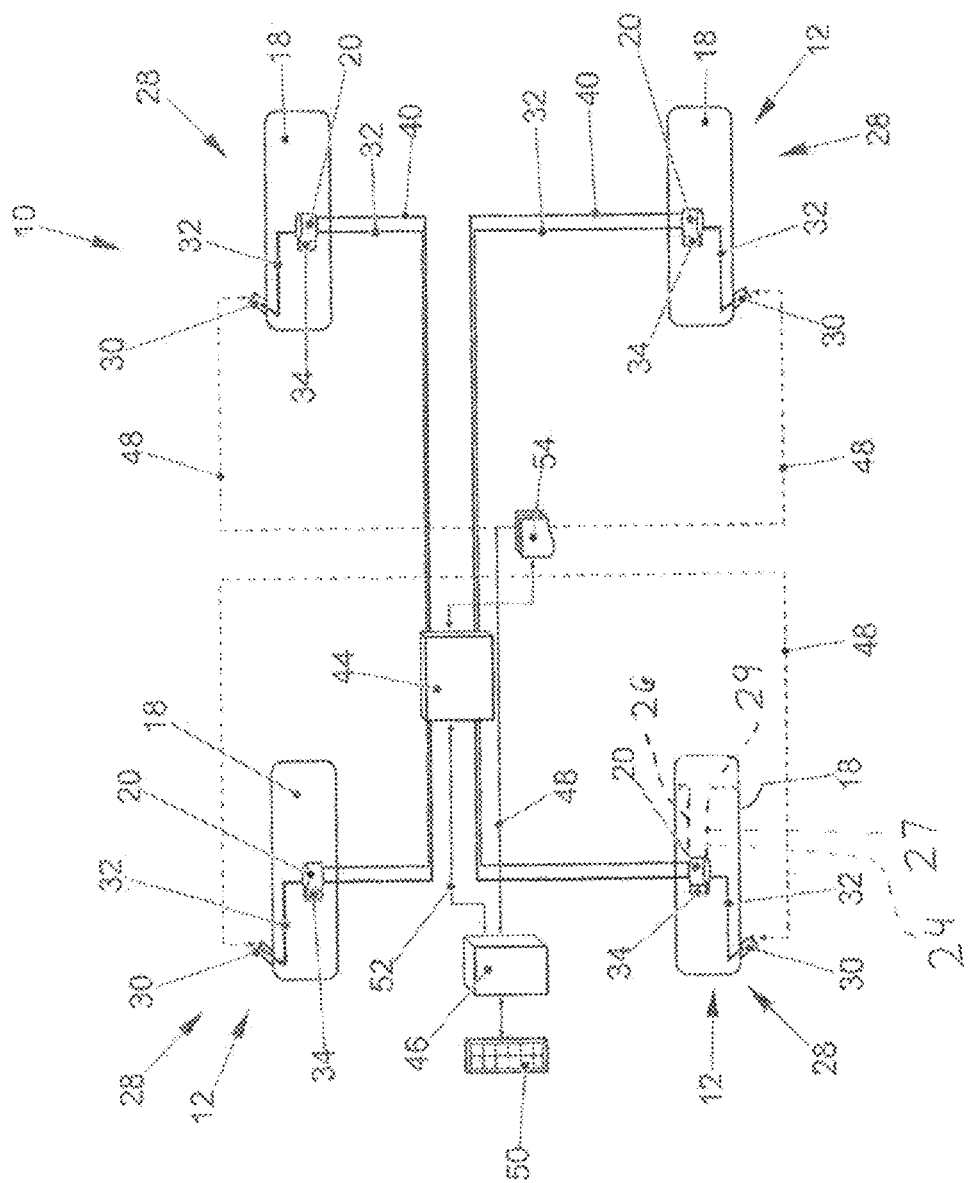

| | | | | |
|---|---|---|---|---|
| 5,178,701 A * | 1/1993 | Taylor | ..................... | B29C 73/22 |
| | | | | 152/418 |
| 5,452,753 A | 9/1995 | Olney | | |
| 5,591,281 A * | 1/1997 | Loewe | ..................... | B60C 23/12 |
| | | | | 152/418 |
| 6,994,136 B2 * | 2/2006 | Stanczak | ............... | B60C 23/004 |
| | | | | 152/418 |
| 7,287,565 B2 * | 10/2007 | Hottebart | ............... | B60C 23/003 |
| | | | | 141/38 |
| 8,123,494 B2 * | 2/2012 | Wakabayashi | ........ | F16C 19/184 |
| | | | | 152/418 |
| 9,039,386 B2 * | 5/2015 | Richardson | ............. | F04C 25/00 |
| | | | | 417/221 |
| 2009/0151835 A1 * | 6/2009 | Manning | ................ | B60C 23/12 |
| | | | | 152/421 |

FOREIGN PATENT DOCUMENTS

| | | | |
|---|---|---|---|
| DE | 69403723 | T2 | 1/1998 |
| DE | 102008054214 | A1 | 5/2010 |
| DE | 202014010520 | U1 | 11/2015 |
| DE | 102015115642 | A1 | 8/2016 |
| DE | 102015115642 | A1 | 3/2017 |
| JP | 2005313738 | A | 11/2005 |

\* cited by examiner

MECHANICALLY DRIVEN TIRE PRESSURE GENERATION MEANS

CROSS-REFERENCE TO RELATED APPLICATIONS

This application claims priority to German Patent Application No. DE 10 2016 119 272.4, filed Oct. 11, 2016, the content of such application being incorporated by reference herein in its entirety.

FIELD OF THE INVENTION

The present invention relates to a wheel hub arrangement having a wheel hub for mounting a rim, in particular for mounting a rim with an inflated tire. The present invention also relates to a rim arrangement having an abovementioned wheel hub arrangement and a rim, in particular a rim with an inflated tire. Furthermore, the invention relates to a vehicle having at least one of the abovementioned wheel hub arrangements and/or at least one of the abovementioned rim arrangements.

BACKGROUND OF THE INVENTION

Systems are known from the prior art, in which a compressor and a compressed air store are carried in a vehicle, in order to realize a tire pressure regulation means in the vehicle. Compressed air can be provided by way of the compressor, in order in this way to fill tires which are mounted on the vehicle. The compressor is typically driven electrically. Systems of this type are used, above all, in trucks. Systems of this type are also used in special vehicles, for example for extreme terrain requirements or for military purposes.

It is a disadvantage in all said known systems that they are large and complicated and require great complexity during mounting. Therefore, they are in practice not suitable for vehicles for individual passenger transport, for example passenger cars.

In this context, DE 67 15 177 U1, which is incorporated by reference herein, has disclosed a vehicle having a tire pressure monitoring device. The vehicle has wheels with a rim and a tire which is pulled onto the latter and encloses a pressure space in a sealed manner. The vehicle additionally comprises a compressor for delivering air, the compressor being connected to the pressure space and it being possible for air to be pressed into or discharged from the pressure space for pressure setting and adaptation to different operating conditions.

Furthermore, JP 2005/313738 A1, which is incorporated by reference herein, has disclosed an apparatus for tire pressure regulation. The apparatus comprises an outlet-side end section of a feed line which is arranged on an axle hub and is open on an outer end face of the vehicle in a flange section of the axle hub. An inlet-side end section of an air introduction line is provided in a wheel, which air introduction line is open on an inner end surface of the vehicle in the wheel of the vehicle toward the wheel arrangement. The outlet-side end section and the inlet-side end section are connected to one another in a sealed manner by way of the mounting of the wheel on the flange section.

SUMMARY OF THE INVENTION

Proceeding from the abovementioned prior art, the invention relates to specifying a wheel hub arrangement of the abovementioned type having a wheel hub for mounting a rim, in particular for mounting a rim with an inflated tire, a rim arrangement having a wheel hub arrangement of this type and a rim, and a vehicle having at least one of the abovementioned wheel hub arrangements and/or at least one of the abovementioned rim arrangements, which make improved compressed air filling of a tire during operation possible, and which can be applied and operated in a simple manner with little complexity.

Described herein is a wheel hub arrangement having a wheel hub for mounting a rim is specified, in particular for mounting a rim with an inflated tire, the wheel hub arrangement having a rotary piston compressor, the rotary piston compressor being mounted rotatably on the wheel hub, the wheel hub arrangement having a switchable mechanical coupling device, by way of which the rotary piston compressor can be switched over between a compression mode, in which the rotary piston compressor can be actuated by way of a rotational movement relative to the mounted rim (16) or the wheel hub (14), and a rest mode, in which it is passive and does not produce any compressed air on the outlet side, and the rotary piston compressor producing compressed air for filling the tire on the outlet side in the compression mode.

According to aspects of the invention, furthermore, a rim arrangement having an above-described wheel hub arrangement and a rim is specified, in particular a rim with an inflated tire.

Moreover, according to aspects of the invention, a vehicle having at least one of the abovementioned wheel hub arrangements and/or at least one of the abovementioned rim arrangements is therefore specified.

It is therefore a concept of the present invention to provide an option for producing compressed air for filling the tire during driving in the region of the wheel hub by way of a wheel hub arrangement of purely mechanical construction. Here, the wheel hub arrangement can be "engaged" or actuated by way of the coupling device, in order to provide the compressed air if required in the compression mode. In the rest mode, losses during the rotation of the wheel on the wheel hub, as occur during driving of the vehicle, can be reduced by way of the "disengaging" of the rotary piston compressor. The rotary piston compressor co-rotates in an idling manner in the rest mode. As a result of the rotatable arrangement of the rotary piston compressor on the wheel hub, compressed air for filling the respective tire can be provided in a simple way in a decentralized manner, that is to say directly in the vicinity of each wheel. Accordingly, only minor modifications are required to further components of the vehicle for the use of the wheel hub arrangement with a wheel hub and a rim. Said modifications are restricted substantially to an actuation of the coupling device and a corresponding connection of the rotary piston compressor to the tire.

In particular, the rotary piston compressor is arranged in a region which is enclosed by a rim which is mounted on the wheel hub. In the axial direction, the rotary piston compressor therefore does not extend beyond the wheel hub or the rim. As a result, the rotary piston compressor does not have any negative effects in flow terms on the aerodynamics of the vehicle, on which the arrangement is mounted.

For operation, the rim is mounted on the wheel hub arrangement. The rotary piston compressor is driven by way of the relative movement of the rim and the wheel hub arrangement. In one preferred embodiment, the wheel hub arrangement comprises an axle or an axle journal, on which the wheel hub is mounted, and the rotary piston compressor can be driven by way of a relative movement of the wheel hub with respect to the axle or the axle journal.

Here, the rotary piston compressor can in principle be arranged in such a way that it is in the compression mode during a rotation relative to the axle or during a rotation relative to the rim.

In one advantageous refinement of the invention, the rotary piston compressor is configured as a Wankel piston. The Wankel piston is known per se in the prior art. The Wankel piston relates to a rotary piston which performs a rotational movement. The Wankel piston is therefore satisfactorily suitable for mounting in the case of small dimensions.

In one advantageous refinement of the invention, the mechanical coupling device comprises a switchable abutment or a switchable freewheel, in order to switch over the rotary piston compressor between the compression mode and the rest mode. A control of the freewheel or the abutment can be carried out, in order to switch over between the compression mode and the rest mode. To this end, the controller preferably detects a current air pressure in the tire, a change in the current air pressure in the tire, a desired air pressure in the tire, a compressed air supply in a compressed air store, and/or any further desired parameters, in order to control the feed of compressed air to the tire.

In one advantageous refinement of the invention, the wheel hub arrangement has a compressed air store which is arranged and configured in such a way that it can be filled by way of the rotary piston compressor. Therefore, a supply of compressed air can already be provided in the compressed air store for filling the tire. The compressed air from the compressed air store can be used directly, with the result that the vehicle does not first of all have to be moved. Therefore, in the case of a tire which is emptied to such an extent that its residual air pressure is not sufficient for driving, for example, the tire can also be filled completely or at least partially. Therefore, the tire can be prepared for driving operation, During driving operation, the tire can possibly be filled completely, if necessary. The compressed air store can also be refilled directly.

In one advantageous refinement of the invention, the wheel hub arrangement has a tire sealant reservoir which is arranged and configured in such a way that a tire sealant can be fed into the compressed air which is produced by the rotary piston compressor on the outlet side. In the case of a tire defect, the tire cannot only be refilled with compressed air by way of the tire sealant from the tire sealant reservoir, but the defect can also be eliminated directly by way of the tire sealant, with the result that the vehicle becomes or remains roadworthy. Tire sealants of this type are known, for example, as "tirefit", in order for it to be possible to dispense with the carrying of a replacement tire in vehicles, which replacement tire requires a large amount of space. However, the tire sealant is usually carried separately and has to be fed to the tire separately in each case by the driver before the supply of compressed air. This is time-consuming and difficult in practice, with the result that the acceptance of said tire sealant is low. The acceptance of tire sealant can be increased by way of the automatic supply.

In order for it to be possible to eliminate the defect on the tire permanently, the use of the tire sealant can be detected and, for example, displayed to the driver. An automatic report to a maintenance center can also take place, in order for it to be possible, for example, for the defective tire to be repaired or replaced during routine maintenance.

In one advantageous refinement of the invention, the compressed air store is arranged in the rim in the rim arrangement, in particular in at least one spoke of the rim. Therefore, the compressed air store can be provided in each case locally, as a result of which the compressed air store can be filled simply and a simple connection to the tire can be established. The compressed air store can be configured as a cavity in the spoke. The connection to a rim ring of the rim is preferably established, with the result that an interior space of the tire can be filled with compressed air via the rim ring. It is also possible that a plurality of cavities in a plurality of spokes together form the compressed air store.

In one advantageous refinement of the invention, the rim has a hollow spoke which is configured as a compressed air connection between the rotary piston compressor and a rim ring. By way of the hollow spoke, an invisible compressed air connection can be established between the rotary piston compressor and an interior space of the tire. This applies correspondingly to a compressed air connection between the rim ring and the compressed air store, if present.

The tire sealant reservoir can in principle also be arranged in the rim.

In one advantageous refinement of the invention, the vehicle has a common compressed air store which is arranged and configured in such a way that it can be filled by way of each rotary piston compressor of the wheel hub arrangements. As a result, compressed air can be provided for all tires even in the case of a failure of a rotary piston compressor. A great quantity of compressed air can also be produced jointly by way of all rotary piston compressors, in order for it to be possible to fill a tire rapidly, for example in the case of a defect.

In one advantageous refinement of the invention, the vehicle has a control device for actuating the arrangements. The control device can be configured to monitor a tire pressure in one or all tires of the vehicle. To this end, the tires are preferably assigned compressed air monitoring devices which report the air pressure of the tire to the control device. In the case of a deviation of the reported air pressure from a desired air pressure, the control device can carry out the filling of the corresponding tire with compressed air via the wheel hub arrangement. Moreover, the control device can be configured to perform an adaptation of the air pressure in the tires in a manner which is dependent on different driving parameters, for example during the transition from a road to a gravel path. To this end, the control device can carry out the filling of the corresponding tire with compressed air via the wheel hub arrangement, or can reduce the air pressure in the tires via an air discharge apparatus which is assigned to each tire.

BRIEF DESCRIPTION OF THE DRAWING FIGURES

Figure 2:
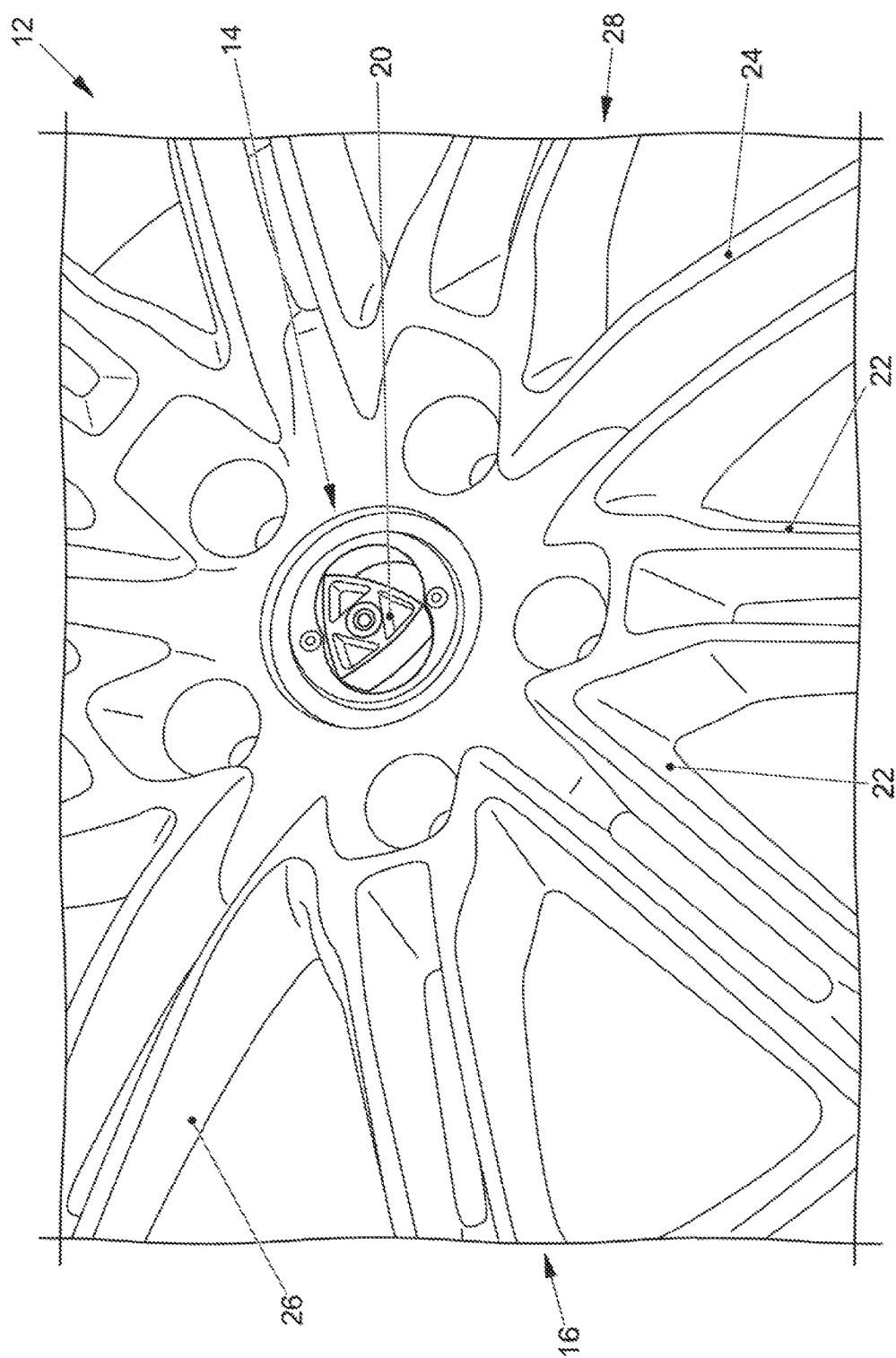

In the following text, the invention will be described in greater detail using preferred embodiments with reference to the appended drawing, in which:

FIG. 1 shows a diagrammatic view of a vehicle having a plurality of wheel hub arrangements in accordance with a first, preferred embodiment of the invention, and FIG. 2 shows a detailed view of a rim arrangement in accordance with the illustration in FIG. 1.

DETAILED DESCRIPTION OF THE INVENTION

FIGS. 1 and 2 relate to a vehicle 10 according to aspects of the invention having a plurality of wheel hub arrangements 12 according to aspects of the invention in accordance with a first, preferred embodiment.

Each wheel hub arrangement 12 comprises a wheel hub 14 for mounting a rim 16 with an inflated tire 18. The tire 18 is mounted on a rim ring (not shown individually) of the rim 16.

Furthermore, the wheel hub arrangement 12 comprises a rotary piston compressor 20 which is mounted on the wheel hub 14. The wheel hub arrangement 12 also comprises an axle (not shown in the figures) or an axle journal, on which the wheel hub 14 is mounted.

Furthermore, the wheel hub arrangement 12 comprises a switchable mechanical coupling device which is not shown in the figures. By way of the switchable mechanical coupling device, the rotary piston compressor 20 can be switched over between a compression mode, in which the rotary piston compressor 20 can be actuated by way of a rotational movement relative to the mounted rim 16 or the wheel hub 14, and a rest mode, in which it is passive and does not produce any compressed air on the outlet side. In the compression mode, the rotary piston compressor 20 produces compressed air for filling the tire 18 on the outlet side by way of the relative rotational movement. The rotary piston compressor 20 is configured as a Wankel piston in said exemplary embodiment. The rotary piston compressor 20 is arranged in a region of the wheel hub 14 in such a way that it is enclosed by the rim 16 which is mounted on the wheel hub 14. In the axial direction, the rotary piston compressor 20 therefore does not extend beyond the wheel hub 14 or the rim 16.

In accordance with the first embodiment, the rotary piston compressor 20 is arranged in such a way that it is in the compression mode during a rotation relative to the axle. The rotary piston compressor 20 is correspondingly rotated with the rim 16. In an alternative embodiment, the rotary piston compressor 20 is in the compression mode during a rotation relative to the rim 16.

In said exemplary embodiment, the mechanical coupling device comprises a switchable abutment, in order to switch over the rotary piston compressor 20 between the compression mode and the rest mode. In an alternative exemplary embodiment, the mechanical coupling device comprises a switchable freewheel. In the rest mode, the rotary piston compressor 20 rotates in an idling manner, with the result that losses during the rotation of the rim 16 on the wheel hub 14 are reduced by way of the "disengaging" of the rotary piston compressor 20.

In accordance with the first embodiment, the wheel hub arrangement 12 has a tire sealant reservoir 34 which is arranged and configured in such a way that a tire sealant can be fed into the compressed air which is produced on the outlet side by the rotary piston compressor 20. In the case of a tire defect, the tire 18 cannot only be refilled with compressed air by way of the tire sealant from the tire sealant reservoir 34, but the defect can also be repaired directly by way of the tire sealant, with the result that the vehicle 10 becomes or remains roadworthy.

In an alternative embodiment, the tire sealant reservoir 34 is arranged in the rim 16.

A rim arrangement 28 in accordance with the first exemplary embodiment comprises in each case one above-described wheel hub arrangement 12 with a rim 16. As shown in detail in FIG. 2, the rim 16 comprises a plurality of spokes 22.

The rim arrangement 28 comprises a compressed air store 24 which is arranged in a spoke 22 of the rim 16. The compressed air store 24 is configured as a cavity in one of the spokes 22.

Moreover, the rim 16 has a hollow spoke 26 which forms a compressed air connection between the rotary piston compressor 20 and a rim ring (not shown here). The hallow spoke 26 forms the compressed air connection 27 between the rotary piston compressor 20 and an interior space 29 of the tire 18 in a manner which is invisible from the outside. Only one instance of the compressed air connection 27 is shown in FIG. 1. The hollow spoke 26 is likewise connected to the compressed air store 24, in order to conduct compressed air out of the compressed air store 24 into the tire 18.

Moreover, a controllable valve 30 is attached on each rim arrangement 28. The valve 30 comprises a pressure measuring device (not shown separately) and is configured to discharge compressed air from the tire 18.

The vehicle 10 comprises a control device 46 for common actuation of the wheel hub arrangements 12. All further components are also actuated via the control device 46, as described in detail in the following text.

The control device 46 is connected via a control line 52 to an energy supply and distributor unit 44. Components are supplied with energy via the energy supply and distributor unit 44, and central communication takes place with the components.

The energy supply and distributor unit 44 is thus connected to an information gathering point 54 with a memory, which information gathering point 54 receives and stores information for processing in the control device 46.

The energy supply and distributor unit 44 is also connected to the valves 30 via signal and supply lines 32. As a result, the valves 30 are supplied with energy and actuated. Moreover, the air pressure in each tire 18 is reported back by the pressure measuring device via the signal and supply lines 32 and is stored in the information gathering point 54. A corresponding information flow 48 is shown correspondingly in FIG. 1, the information flow 48 passing from the information gathering point 54 further to the control device 45.

The energy supply and distributor unit 44 is also connected via signal and supply lines 40 to the wheel hub arrangements 12. As a result, the mechanical coupling devices and the tire sealant reservoir 34 are supplied with energy and actuated.

In said exemplary embodiment, the control device 46 is configured to monitor the tire pressure in all tires 18 of the vehicle 10. If a tire pressure which is reported by a pressure measuring device in one or more tires 18 is below a desired pressure, the control device 46 controls the filling of the corresponding tire 18 with compressed air via the rotary piston compressor 20, by said control device 46 actuating the mechanical coupling device and transferring the rotary piston compressor 20 out of the rest mode into the compression mode. Thereupon, the rotary piston compressor 20 produces compressed air on the outlet side, which compressed air is conducted via the hollow spoke 26 into the tire.

If the tire pressure which is reported by the pressure measuring device in the tire 18 drops further or at least does not rise sufficiently, as would be expected in the compression mode, this is detected as a defect of the tire 18. Accordingly, the control device 46 carries out an actuation of the tire sealant reservoir 34, in order to seal the tire 18 with tire sealant which is output from the tire sealant reservoir 34 and to eliminate the defect. Moreover, the actuation of the tire sealant reservoir 34 is displayed by the control device 46 via a user interface 50 in the vehicle 10, since the damaged tire 18 must be loaded only to a restricted extent despite having been sealed with the tire sealant. A vehicle driver can receive the report about the defective tire 18 via the user interface 50. In order to eliminate the defect on the tire 18 permanently, an automatic report to a maintenance center takes place by the control device 46, in order to replace the defective tire 18 during maintenance or repair.

If the reported tire pressure in one or more tires 18 is above a desired pressure, the control device 46 controls the discharge of compressed air from the corresponding tire 18 via the valve 30. Accordingly, the valve 30 is opened until the desired pressure is reached.

Moreover, the control device 46 is configured to perform an adaptation of the air pressure in the tires 18 in a manner which is dependent on different driving parameters which it receives, for example, via the user interface 50, for example during the transition from a road to a gravel path. To this end, the tires 18 are filled with compressed air via the rotary piston compressor 20 of the wheel hub arrangement 12, as described above, or air is discharged from the tires via the respective valve 30, in order to reduce the air pressure in the tires 18.

In addition to the current air pressure in the tires 18, the controller can also detect a change in the current air pressure in the tires 18, a desired air pressure in the tire 18, a compressed air supply in the compressed air store 24, and/or any further desired parameters, in order to carry out the control of the air pressure in the tires 18.

LIST OF DESIGNATIONS

Vehicle 10
Wheel hub arrangement 12
Wheel hub 14
Rim 16
Tire 18
Rotary piston compressor 20
Spoke 22
Compressed air store 24
Hollow spoke 26
Compressed air connection 27
Rim arrangement 28
Interior space 29
Valve 30
Signal and supply line 32
Tire sealant reservoir 34
Signal and supply line 40
Energy supply and distributor unit 44
Control device 46
Information flow 48
User interface 50
Control line 52
Information gathering point 54

What is claimed is:

1. A wheel hub arrangement having a wheel hub for mounting a rim of the wheel hub arrangement with an inflatable tire, the wheel hub arrangement comprising:

a rotary piston compressor that is mounted rotatably on the wheel hub, the rotary piston compressor being configured to be switched over between a compression mode, in which the rotary piston compressor is configured to be actuated by way of a rotational movement relative to the mounted rim or the wheel hub, and a rest mode, in which the rotary piston compressor is passive and does not produce any compressed air, and wherein the rotary piston compressor produces compressed air for filling the tire in the compression mode, wherein the wheel hub arrangement has a tire sealant reservoir which is arranged and configured in such a way that a tire sealant can be fed into the compressed air which is produced by the rotary piston compressor.

2. The wheel hub arrangement as claimed in claim 1, wherein the rotary piston compressor is configured as a Wankel piston.

3. The wheel huh arrangement as claimed in claim 1, wherein the wheel hub arrangement has a compressed air store which is configured to be filled by the rotary piston compressor.

4. A wheel arrangement comprising:
a wheel hub having a rotary piston compressor;
a rim with an inflatable tire that is mounted to the wheel hub;
wherein the wheel hub has a hollow spoke which is configured as a compressed air connection between the rotary piston compressor and the rim of the wheel arrangement, wherein the rotary piston compressor is positioned outside of the hollow spoke.

5. The wheel arrangement as claimed in claim 4, wherein a compressed air store, which is configured to be filled by the rotary piston compressor, is arranged in at least one spoke of the wheel arrangement.

6. A vehicle having a plurality of the wheel hub arrangements as claimed in claim 1.

7. The vehicle as claimed in claim 6, wherein the vehicle has a common compressed air store which is configured to be filled by way of each rotary piston compressor of the wheel hub arrangements.

8. The vehicle as claimed in claim 6, wherein the vehicle has a control device for actuating the wheel hub arrangements.

9. The wheel hub arrangement as claimed in claim 1, further comprising a valve for discharging air from the tire.

* * * * *

UNITED STATES PATENT AND TRADEMARK OFFICE
CERTIFICATE OF CORRECTION

PATENT NO. : 10,442,258 B2
APPLICATION NO. : 15/724523
DATED : October 15, 2019
INVENTOR(S) : Michael Glatz Page 1 of 1

It is certified that error appears in the above-identified patent and that said Letters Patent is hereby corrected as shown below:

In the Claims

At Column 8, Line 20, Claim 3:
"The wheel huh" should read --The wheel hub--.

Signed and Sealed this
Thirty-first Day of December, 2019

Andrei Iancu
*Director of the United States Patent and Trademark Office*